United States Patent
Kuboyama et al.

(10) Patent No.: US 12,319,827 B2
(45) Date of Patent: Jun. 3, 2025

(54) CONDUCTIVE INK OR CONDUCTIVE PASTE, AND METHOD FOR PRODUCING THE SAME

(71) Applicant: TOYOTA JIDOSHA KABUSHIKI KAISHA, Toyota (JP)

(72) Inventors: Daiki Kuboyama, Toyota (JP); Jyunya Murai, Nisshin (JP); Kazuyuki Kuwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/387,935

(22) Filed: Nov. 8, 2023

(65) Prior Publication Data
US 2024/0199905 A1    Jun. 20, 2024

(30) Foreign Application Priority Data
Dec. 14, 2022  (JP) ................. 2022-199260

(51) Int. Cl.
  *C09D 11/52* (2014.01)
  *C09D 11/033* (2014.01)
  *C09D 11/037* (2014.01)
  *C09D 11/106* (2014.01)

(52) U.S. Cl.
  CPC ............ *C09D 11/52* (2013.01); *C09D 11/033* (2013.01); *C09D 11/037* (2013.01); *C09D 11/106* (2013.01)

(58) Field of Classification Search
  CPC ................ C09D 11/52; C09D 11/033
  See application file for complete search history.

(56) References Cited

FOREIGN PATENT DOCUMENTS

| CN | 115322623 A | 11/2022 | |
|---|---|---|---|
| JP | 3796476 B2 * | 7/2006 | ............. C09D 11/00 |
| JP | 2008-214591 A | 9/2008 | |
| JP | 2018-204013 A | 12/2018 | |
| JP | 2020-090561 A | 6/2020 | |
| JP | 2023-130600 A | 9/2023 | |
| KR | 20200140359 A * | 12/2020 | ............. C09D 11/52 |
| KR | 10-2456777 B1 | 10/2022 | |
| WO | 2019/116978 A1 | 6/2019 | |
| WO | WO 2020/170012 A1 * | 8/2020 | ............. C09D 11/52 |

\* cited by examiner

*Primary Examiner* — Khanh T Nguyen
(74) *Attorney, Agent, or Firm* — Oliff PLC

(57) ABSTRACT

The present disclosure provides a conductive ink or a conductive paste having highly conductive property and excellent low-temperature sinterability. One aspect of the present disclosure relates to a conductive ink or a conductive paste containing metal nanoparticles, a water or a hydrophilic solvent having a vapor pressure of 10 hPa or more, and an additive solvent. A distance Ra between a Hansen solubility parameter of the metal nanoparticles and a Hansen solubility parameter of the additive solvent is in a range of from 2.5 to 13. A distance Rb between a Hansen solubility parameter of the water or the hydrophilic solvent and the Hansen solubility parameter of the additive solvent is 35 or less. Another aspect of the present disclosure relates to a method for producing the conductive ink or the conductive paste, and a method for selecting the additive solvent contained in the conductive ink or the conductive paste.

16 Claims, No Drawings

CONDUCTIVE INK OR CONDUCTIVE PASTE, AND METHOD FOR PRODUCING THE SAME

CROSS REFERENCE TO RELATED APPLICATIONS

The present application claims priority from Japanese patent application JP 2022-199260 filed on Dec. 14, 2022, the entire content of which is hereby incorporated by reference into this application.

BACKGROUND

Technical Field

The present disclosure relates to a conductive ink or a conductive paste, and a method for producing the same.

Background Art

As a method for producing a wiring material or a joint material for an electronic circuit and the like, a printing method, such as an ink-jet printing method, is used instead of a conventional etching method. In the printing method, a conductive ink or a conductive paste is printed on a substrate to form a pattern of the conductive ink or the conductive paste, and the substrate on which the pattern has been formed is heated to sinter the conductive ink or the conductive paste, thereby forming a wiring material or a joint material on the substrate. The conductive ink usually has a form of a dispersion liquid in which conductive metal particles are dispersed in a solvent. The conductive paste usually has a form of a high-viscosity dispersion liquid in which conductive metal particles contained by a high content are dispersed in a solvent. For the conductive ink and the conductive paste, any of water, a hydrophilic solvent, and a hydrophobic solvent can be used. However, recently, considering the reduction of environmental load, a conductive ink or a conductive paste using water or a hydrophilic solvent is desired.

For example, WO 2019/116978 discloses a metal ink applied over a substrate to form a metal pattern. The metal ink contains a metal colloid and a dispersion medium. In the substrate, at least a region in which the metal pattern is formed contains a thermoplastic resin. A distance Dc between Hansen solubility parameters of the dispersion medium and the metal colloid is 10 MPa$^{0.5}$ or less, and a distance Ds between Hansen solubility parameters of the dispersion medium and the thermoplastic resin is 10 MPa$^{0.5}$ or more.

JP 2018-204013 A discloses a conductive ink containing silver colloidal particles, water, and diethylene glycol monoisobutyl ether. The silver colloidal particles contain silver nanoparticles and a dispersant.

JP 2020-90561 A discloses a silver nanoparticle ink containing silver nanoparticles, water, a compound represented by a formula (1): RO—$(C_3H_6O_2)_n$—H (in the formula, R represents a linear or branched alkyl group or alkenyl group having 8 to 22 carbon atoms that may have a hydroxyl group, and n is from 1 to 20), and a polyhydric alcohol. The content of the compound represented by the formula (1) is from 0.1 mass % to 2.9 mass %.

JP 2008-214591 A discloses a conductive ink containing a solid content and a solvent. The solid content contains metal colloidal particles containing a metal component and an organic component as a main component. The solvent contains water and a polyhydric alcohol compound in a range of 1 weight % or more and 40 weight % or less. The polyhydric alcohol compound is polyethylene glycol having a weight average molecular weight of 600 or more and 1,000 or less, and/or a polyhydric alcohol having carbon atoms in a range of 4 or more and 6 or less and having the number of hydroxyl groups in a range of 2 or more and 3 or less.

SUMMARY

The conductive ink and the conductive paste for producing a wiring material or a joint material of an electronic circuit and the like by the printing method are required to have not only highly conductive property but also excellent low-temperature sinterability. However, there are some problems in the conventional conductive ink and conductive paste.

Recently, in the conductive ink and the conductive paste, water or a hydrophilic solvent is generally used considering the reduction of environmental load. In the aqueous conductive ink and conductive paste, dispersibility of metal particles is usually low. Therefore, in the aqueous conductive ink and conductive paste, a dispersion medium and/or a dispersant that can improve the dispersibility of metal particles are added in some cases (for example, WO 2019/116978, JP 2018-204013 A, JP 2020-90561 A, and JP 2008-214591 A). However, in a case where a dispersion medium having a high boiling point is used, the dispersion medium possibly does not sufficiently vaporize regardless of the sintering of the conductive ink or the conductive paste in a low temperature region. Similarly, when a non-volatile or low-volatility dispersant is used, the dispersant possibly remains in a sintered body of the conductive ink or the conductive paste. In these cases, as a result, the volume resistivity of the obtained sintered body of the conductive ink or the conductive paste increases, and the conductive property is possibly reduced. Additionally, the dispersion medium remaining in the sintered body gradually vaporizes and separation or the like of the sintered body is caused, and thus the durability of the sintered body is possibly reduced.

Accordingly, the present disclosure provides a conductive ink or a conductive paste having highly conductive property and excellent low-temperature sinterability.

The inventors examined various means for solving the above-described problems. The inventors have found that in a conductive ink or a conductive paste containing metal nanoparticles, water or a hydrophilic solvent, and an additive solvent, by selecting the water or the hydrophilic solvent having a predetermined vapor pressure and selecting the additive solvent based on a Hansen solubility parameter, a conductive ink or a conductive paste having highly conductive property and excellent low-temperature sinterability can be obtained. The inventors achieved the present disclosure based on the knowledge.

That is, the present disclosure includes the following aspects and embodiments.

Embodiment 1

A conductive ink or a conductive paste comprises metal nanoparticles, a water or a hydrophilic solvent having a vapor pressure of 10 hPa or more, and an additive solvent. A distance Ra between a Hansen solubility parameter of the metal nanoparticles and a Hansen solubility parameter of the additive solvent is in a range of from 2.5 to 13. A distance Rb between a Hansen solubility parameter of the water or the hydrophilic solvent and the Hansen solubility parameter of the additive solvent is 35 or less.

Embodiment 2

In the conductive ink or the conductive paste according to the embodiment 1, a content of the additive solvent is in a range of from 0.5 mass % to 15 mass % relative to a total mass of the conductive ink or the conductive paste.

Embodiment 3

In the conductive ink or the conductive paste according to the embodiment 1 or 2, the metal nanoparticles have a protective agent, the protective agent is a compound containing nitrogen atoms or sulfur atoms, and the compound has high adsorptivity to a metal and hydrophilicity.

Embodiment 4

In the conductive ink or the conductive paste according to the embodiment 3, the protective agent is polyvinylpyrrolidone.

Embodiment 5

In the conductive ink or the conductive paste according to any of the embodiments 1 to 4, the water or the hydrophilic solvent is water, methanol, ethanol, propanol, tert-butyl alcohol, or glycidol.

Embodiment 6

In the conductive ink or the conductive paste according to the embodiment 5, the water or the hydrophilic solvent is water or ethanol.

Embodiment 7

In the conductive ink or the conductive paste according to any of the embodiments 1 to 6, the additive solvent is 3-methoxy-3-methyl butanol, diacetone alcohol, ethyl lactate, propylene glycol, N,N-dimethylacetamide, tetrahydrofurfuryl alcohol, tetramethylurea, N,N-dimethylformamide, methylcyclohexanol, heptanol, hexanol, or ethylene glycol, or a mixture thereof.

Embodiment 8

In the conductive ink or the conductive paste according to the embodiment 7, the additive solvent is 3-methoxy-3-methyl butanol, diacetone alcohol, ethyl lactate, propylene glycol, or N,N-dimethylacetamide.

Embodiment 9

A method for producing the conductive ink or the conductive paste according to any of the embodiments 1 to 8 comprises: preparing metal nanoparticles and a water or a hydrophilic solvent having a vapor pressure of 10 hPa or more; and selecting an additive solvent having a Hansen solubility parameter with a distance Ra from a Hansen solubility parameter of the metal nanoparticles in a range of from 2.5 to 13 and a distance Rb from a Hansen solubility parameter of the water or the hydrophilic solvent of 35 or less.

Embodiment 10

A method for selecting an additive solvent contained in a conductive ink or a conductive paste, the conductive ink or the conductive paste containing metal nanoparticles, a water or a hydrophilic solvent having a vapor pressure of 10 hPa or more, and an additive solvent, the method comprises selecting an additive solvent having a Hansen solubility parameter with a distance Ra from a Hansen solubility parameter of the metal nanoparticles in a range of from 2.5 to 13 and a distance Rb from a Hansen solubility parameter of the water or the hydrophilic solvent of 35 or less.

The present disclosure can provide the conductive ink or the conductive paste having highly conductive property and excellent low-temperature sinterability.

DETAILED DESCRIPTION

The following describes embodiments of the present disclosure in detail.

1: Conductive Ink or Conductive Paste

One aspect of the present disclosure relates to a conductive ink or a conductive paste. The conductive ink or the conductive paste of the aspect contains metal nanoparticles, water or a hydrophilic solvent, and an additive solvent.

[1-1: Metal Nanoparticles]

In the conductive ink or the conductive paste of the aspect, the metal nanoparticles mean any metal particles having a particle diameter of a nanometer level. While the metal constituting the metal nanoparticles is not limited, examples of the metal can include gold, silver, platinum, copper, nickel, iron, and cobalt. The metal constituting the metal nanoparticles only needs to be a single metallic element or an alloy of the metallic elements exemplified above.

The particle diameter of the metal nanoparticles may be in a range of from 2 nm to 2,000 nm, and is in a range of from 2 nm to 1,000 nm in some embodiments, in a range of from 3 nm to 100 nm in some embodiments, and in a range of from 5 nm to 80 nm in some embodiments. In the conventional technique, for improving low-temperature sinterability, there has been known a conductive ink or a conductive paste containing metal particles having a small particle diameter of a few nm. However, the metal particles having such a small particle diameter possibly increase in production cost. In contrast, as described below, the conductive ink or the conductive paste of the aspect can be provided with excellent low-temperature sinterability by selecting a water or a hydrophilic solvent having a predetermined vapor pressure and selecting an additive solvent based on a Hansen solubility parameter. Therefore, the conductive ink or the conductive paste of the aspect can be provided with the excellent low-temperature sinterability even when the metal nanoparticles having the particle diameter in the exemplified range are contained.

In an embodiment of the conductive ink of the aspect, a content of the metal nanoparticles is ordinarily 95 mass % or less relative to the total mass of the conductive ink, may be in a range of from 5 mass % to 95 mass %, and is in a range of from 5 mass % to 50 mass % in some embodiments, and in a range of from 10 mass % to 25 mass % in some embodiments. In a case of an embodiment in which the metal nanoparticles are contained by less than 1 mass % relative to the total mass of the conductive ink, the conductive ink of the aspect is especially referred to as a "conductive slurry" in some cases.

In an embodiment of the conductive paste of the aspect, a content of the metal nanoparticles may be in a range of from 60 mass % to 95 mass % relative to the total mass of the conductive paste, and is in a range of from 70 mass % to 95 mass % in some embodiments, and in a range of from 80 mass % to 95 mass % in some embodiments.

In one embodiment, the metal nanoparticles may have a protective agent. The protective agent means a compound that has high adsorptivity to a metal and hydrophilicity and is capable of substantially suppressing aggregation of metal nanoparticles thereby. The protective agent is ordinarily a compound containing nitrogen atoms or sulfur atoms and having high adsorptivity to a metal and hydrophilicity. The protective agent may be polyvinylpyrrolidone (PVP), adenylic acid, dodecylamine, dodecanethiol, or polyacrylic acid, and is PVP in some embodiments. In the conductive ink or the conductive paste of the aspect, the metal nanoparticles having the protective agent can substantially suppress the aggregation of the metal nanoparticles.

[1-2: Water or Hydrophilic Solvent]

In the conductive ink or the conductive paste of the aspect, the water or the hydrophilic solvent ordinarily has a vapor pressure of 10 hPa or more. The vapor pressure of the water or the hydrophilic solvent may be in a range of from 10 hPa to 150 hPa, and is in a range of from 10 hPa to 100 hPa in some embodiments, and in a range of from 10 hPa to 70 hPa in some embodiments. When the vapor pressure of the water or the hydrophilic solvent is less than the lower limit value, an azeotropy with the additive solvent is not caused, and the water or the hydrophilic solvent possibly vaporizes alone. In this case, the additive solvent remains regardless of the sintering of the conductive ink or the conductive paste of the aspect in a low temperature region, as a result, the volume resistivity of the obtained sintered body of the conductive ink or the conductive paste increases, and the conductive property is possibly reduced. Additionally, the additive solvent remaining in the sintered body gradually vaporizes and separation or the like of the sintered body is caused, and thus the durability of the sintered body is possibly reduced. When the vapor pressure of the water or the hydrophilic solvent exceeds the upper limit value, the water or the hydrophilic solvent possibly does not sufficiently vaporize by the sintering in a low temperature region. In this case, as a result, the volume resistivity of the obtained sintered body of the conductive ink or the conductive paste increases, and the conductive property is possibly reduced. Therefore, by using the water or the hydrophilic solvent having the vapor pressure in the above-described range, the conductive ink or the conductive paste of the aspect can be provided with highly conductive property and excellent low-temperature sinterability.

The water or the hydrophilic solvent may be water, methanol, ethanol, propanol, tert-butyl alcohol, or glycidol, and is water or ethanol in some embodiments. By using the water or the hydrophilic solvent exemplified above, the conductive ink or the conductive paste of the aspect can be provided with highly conductive property and excellent low-temperature sinterability.

[1-3: Additive Solvent]

In the conductive ink or the conductive paste of the aspect, the additive solvent means a dispersion medium that improves dispersibility of the metal nanoparticles. The inventors have found that by using an additive solvent having a distance Ra between a Hansen solubility parameter of the metal nanoparticles and a Hansen solubility parameter of the additive solvent and a distance Rb between a Hansen solubility parameter of the water or the hydrophilic solvent and the Hansen solubility parameter of the additive solvent in predetermined ranges, the conductive ink or the conductive paste with highly conductive property and excellent low-temperature sinterability can be obtained.

The Hansen solubility parameter (hereinafter also referred to as "HSP") is an index of the solubility that indicates a degree to which a substance and another substance are soluble in one another. The HSP is a parameter of vector quantity in which a solubility parameter of Hildebrand is divided into three cohesive energy components of a dispersion force, a dipole-dipole force, and a hydrogen-bonding force. In the HSP vector, a component corresponding to the dispersion force is referred to as a dispersion term (hereinafter also represented as "$\delta D$"), a component corresponding to the dipole-dipole force is referred to as a polarity term (hereinafter also represented as "$\delta P$"), and a component corresponding to the hydrogen-bonding force is referred to as a hydrogen-bonding term (hereinafter also represented as "$\delta H$").

Since the HSP is a vector quantity, it has been known that pure substances hardly have exactly the same value. A generally used database that records the HSP values of publicly known substances is established. Therefore, those skilled in the art can obtain the HSP value of a desired substance by referring to the database. Even for a substance whose HSP value is not recorded in the database, those skilled in the art can calculate the HSP value from its chemical structure using computer software, such as HSPiP (Hansen Solubility Parameters in Practice). The computer software includes the above-described database in which the HSP values of the publicly known substances are recorded.

A distance between the HSP of a substance and the HSP of another substance indicates the solubility of these substances. Generally, the smaller the distance between the HSP of a substance and the HSP of another substance is, the higher the solubility of these substances becomes. As described above, the HSP is a vector quantity including $\delta D$, $\delta P$, and $\delta H$. Therefore, the distance between the HSP of a substance and the HSP of another substance can be calculated as a distance between the HSPs present in a three-dimensional space (hereinafter also referred to as an "HSP space") including $\delta D$, $\delta P$, and $\delta H$. In a case where there are a plurality of other substances having similar solubilities with respect to a reference substance, by plotting the HSP values of the respective substances in the HSP space, the HSP values of the plurality of other substances are plotted on a surface of a sphere having the HSP value of the reference substance as the center (hereinafter also referred to as a "Hansen solubility sphere").

The distance Ra between the HSP of the metal nanoparticles and the HSP of the additive solvent is usually in a range of from 2.5 to 13. The distance Ra may be in a range of from 2.9 to 12.6. The distance Ra in the exemplified range increases wettability of the additive solvent to the metal nanoparticles. Therefore, the dispersibility of the metal nanoparticles of the conductive ink or the conductive paste of the aspect increases. In this case, the liquid phase sinterability in a low temperature region of the conductive ink or the conductive paste of the aspect can be improved. Accordingly, by using the additive solvent having the distance Ra in the exemplified range, the conductive ink or the conductive paste of the aspect can be provided with excellent low-temperature sinterability.

The distance Rb between the HSP of the water or the hydrophilic solvent and the HSP of the additive solvent is usually 35 or less. The distance Rb may be in a range of from 2.5 to 35, and is in a range of from 2.6 to 32.5 in some embodiments. When the distance Rb exceeds the upper limit value, an azeotropy of the water or the hydrophilic solvent and the additive solvent is not caused, and the water or the hydrophilic solvent possibly vaporizes alone. In this case, the additive solvent remains regardless of the sintering of the conductive ink or the conductive paste of the aspect in a low temperature region, as a result, the volume resistivity of the obtained sintered body of the conductive ink or the conductive paste increases, and the conductive property is possibly reduced. Additionally, the additive solvent remaining in the sintered body gradually vaporizes and separation or the like of the sintered body is caused, and thus the durability of the sintered body is possibly reduced. Therefore, by using the additive solvent having the distance Rb in the exemplified range, the conductive ink or the conductive paste of the aspect can be provided with highly conductive property and excellent low-temperature sinterability.

The additive solvent having the distances Ra and Rb of the HSP in the exemplified ranges can be selected by performing a method for producing the conductive ink or the conductive paste or a method for selecting the additive solvent described below.

A content of the additive solvent may be in a range of from 0.5 mass % to 15 mass % relative to the total mass of the conductive ink or the conductive paste. When the content of the additive solvent is less than the lower limit value, a desired effect as a dispersion medium possibly cannot be sufficiently provided. When the content of the additive solvent exceeds the upper limit value, the additive solvent remains regardless of the sintering of the conductive ink or the conductive paste of the aspect in a low temperature region, as a result, the volume resistivity of the obtained sintered body of the conductive ink or the conductive paste increases, and the conductive property is possibly reduced. Accordingly, by using the additive solvent by the content in the exemplified range, the conductive ink or the conductive paste of the aspect can be provided with highly conductive property and excellent low-temperature sinterability.

The additive solvent may be 3-methoxy-3-methyl butanol, diacetone alcohol, ethyl lactate, propylene glycol, N,N-dimethylacetamide, tetrahydrofurfuryl alcohol, tetramethylurea, N,N-dimethylformamide, methylcyclohexanol, heptanol, hexanol, or ethylene glycol, or a mixture thereof, and is 3-methoxy-3-methyl butanol, diacetone alcohol, ethyl lactate, propylene glycol, or N,N-dimethylacetamide in some embodiments. By using the exemplified additive solvent, the conductive ink or the conductive paste of the aspect can be provided with highly conductive property and excellent low-temperature sinterability.

In some embodiments, the conductive ink or the conductive paste of the aspect:
- contains metal nanoparticles with/without a protective agent, water, and 3-methoxy-3-methyl butanol, diacetone alcohol, ethyl lactate, propylene glycol, or N,N-dimethylacetamide; or
- contains metal nanoparticles with/without a protective agent, ethanol, and propylene glycol.

By containing the exemplified components, the conductive ink or the conductive paste of the aspect can be provided with highly conductive property and excellent low-temperature sinterability.

In each aspect of the present disclosure, the conductive ink is usually a dispersion liquid containing metal nanoparticles having the above-described features, a water or a hydrophilic solvent having the above-described features, and an additive solvent having the above-described features. In each aspect of the present disclosure, the conductive paste is usually a high-viscosity dispersion liquid containing metal nanoparticles having the above-described features, a water or a hydrophilic solvent having the above-described features, and an additive solvent having the above-described features.

As described above, the conductive paste of the aspect usually contains the metal nanoparticles by a high content compared with the conductive ink of the aspect. This allows the conductive paste of the aspect to have the high viscosity compared with the conductive ink of the aspect.

The conductive ink or the conductive paste of the aspect may further contain a binder in addition to the above-described components. By containing the binder, the conductive ink or the conductive paste of the aspect can have the appropriate viscosity described below.

The viscosity of the conductive ink of the aspect is usually in a range of from 1 mPa·s to 10,000 mPa·s, for example, in a range of from 1 mPa·s to 1,000 mPa·s, furthermore, for example, in a range of from 1 mPa·s to 100 mPa·s, and especially, in a range of from 1 mPa·s to 20 mPa·s. It has been known that the viscosity of the conductive ink appropriate for the printing method is in a range of from 1 mPa·s to 20 mPa·s. Accordingly, the conductive ink of the aspect having the viscosity in the exemplified range can be appropriately used for the printing method.

The viscosity of the conductive paste of the aspect is usually 10 Pa·s or more, and for example, in a range of from 10 Pa·s to 100 Pa·s. It has been known that the viscosity of the conductive paste appropriate for printing methods is 10 Pa·s or more. Accordingly, the conductive paste of the aspect having the viscosity in the exemplified range can be appropriately used for the printing method.

The surface tension of the conductive ink of the aspect is usually in a range of from 20 mN/m to 40 mN/m, and for example, in a range of from 25 mN/m to 38 mN/m. It has been known that the surface tension of the conductive ink appropriate for printing methods is in a range of from 20 mN/m to 40 mN/m. When the surface tension of the conductive ink is less than the lower limit value, a wettability of the conductive ink becomes high, and it possibly becomes difficult to form a fine pattern on a substrate in the production of an applicable product of the conductive ink. When the surface tension of the conductive ink exceeds the upper limit value, a wettability of the conductive ink becomes low, and a pattern of the conductive ink is possibly interrupted on a substrate in the production of an applicable product of the conductive ink. Accordingly, the conductive ink of the aspect having the surface tension in the exemplified range can be appropriately used for printing methods.

The surface tension of the conductive paste of the aspect usually only needs to be in a range similar to the above-described appropriate range of the surface tension of the conductive ink of the aspect when it is measurable. When the viscosity of the conductive paste of the aspect is high, the surface tension of the conductive paste cannot be measured in some cases. Even in this case, when the viscosity of the conductive paste of the aspect is within the above-described appropriate range, the conductive paste of the aspect can be appropriately used for printing methods.

2: Applicable Product of Conductive Ink or Conductive Paste

The conductive ink or the conductive paste of one aspect of the present disclosure has highly conductive property and excellent low-temperature sinterability. Therefore, another aspect of the present disclosure relates to a product that is obtained or can be obtained by the conductive ink or the conductive paste of the one aspect of the present disclosure.

A product of the aspect includes a substrate, and a sintered body of a metal pattern disposed on the substrate and formed of the conductive ink or the conductive paste of the one aspect of the present disclosure. In the product of the aspect, the sintered body of the metal pattern formed of the conductive ink or the conductive paste of the one aspect of the present disclosure is disposed as a wiring material or a joint material on the substrate. The conductive ink or the conductive paste of the one aspect of the present disclosure has highly conductive property and excellent low-temperature sinterability. Therefore, the product of the aspect can provide highly conductive property.

While the product of the aspect is not limited, examples of the product of the aspect can include an antenna, a touch panel, a circuit, a heater, and a photovoltaic cell. By obtaining the exemplified product by the conductive ink or the conductive paste of the one aspect of the present disclosure, the product can provide highly conductive property.

The product of the aspect can be produced by a method including:
a substrate preparing step of preparing a substrate;
a pattern forming step of applying the conductive ink or the conductive paste of the one aspect of the present disclosure over the substrate to form a pattern of the conductive ink or the conductive paste; and
a sintering step of heating the substrate on which the pattern of the conductive ink or the conductive paste has been formed to form a sintered body of the metal pattern.

In the method for producing the product of the aspect, the material and the shape of the substrate can be appropriately selected based on the product. As described below, the sintering step of the method for producing the product of the aspect is performed in a low temperature region. Therefore, the material of the substrate may be a material having a low heat-resistant temperature.

In the method for producing the product of the aspect, the pattern forming step can be performed by any method ordinarily used in the technical field, such as ink-jet printing method, screen printing method, letterpress method, intaglio printing method, reverse printing method, microcontact printing method, dipping method, spraying method, bar-coating method, spin coating method, dispenser method, casting method, flexographic method, gravure method, syringe method, and application method with a brush.

In the method for producing the product of the aspect, the heating temperature in the sintering step may be 50° C. or more, and is in a range of from 50° C. to 100° C. in some embodiments, and in a range of from 60° C. to 100° C. in some embodiments. The heating time in the sintering step may be in a range of from 5 minutes to 120 minutes, and is in a range of from 5 minutes to 60 minutes. By performing the sintering step at the heating temperature for the heating time in the exemplified ranges, the water or the hydrophilic solvent and the additive solvent contained in the conductive ink or the conductive paste can be substantially vaporized without substantially causing an influence not appropriate for the quality of the product, thereby allowing the formation of the sintered body of the metal pattern.

3: Method for Producing Conductive Ink or Conductive Paste

Another aspect of the present disclosure relates to a method for producing the conductive ink or the conductive paste of the one aspect of the present disclosure. The producing method of the aspect includes a material preparation step and an additive solvent selection step. The producing method of the aspect may include a dispersion step as necessary. The following describes each of the steps.

[3-1: Material Preparation Step]

The producing method of the aspect includes a material preparation step of preparing metal nanoparticles and a water or a hydrophilic solvent having a vapor pressure of 10 hPa or more.

The metal nanoparticles, the protective agent, and the water or the hydrophilic solvent prepared in the step have the above-described features. The metal nanoparticles, the protective agent, and the water or the hydrophilic solvent having such features may be prepared by purchasing a commercial product, or may be prepared by producing them by oneself.

In this step, when the metal nanoparticles are prepared, the metal nanoparticles can be prepared by heating and reducing an aqueous solution of the corresponding metal ion in the presence of a reductant.

In an embodiment in which the metal nanoparticles have the protective agent, the metal nanoparticles can be prepared by heating and reducing an aqueous solution of the corresponding metal ion in the presence of a protective agent and a reductant.

In the preparation of the metal nanoparticles, examples of the aqueous solution of metal ion can include an aqueous solution of nitrate, cyanide salt, and acetate of the metal. Examples of the reductant can include N,N-dimethylformamide (DMF), citric acid, formalin, ascorbic acid, oxalic acid, hydrogen peroxide, and hydrazine.

In the preparation of the metal nanoparticles, the heating temperature may be 50° C. or more, and is in a range of from 50° C. to 100° C. in some embodiments, and in a range of from 60° C. to 90° C. in some embodiments. The heating time may be in a range of from 5 minutes to 120 minutes, and is in a range of from 10 minutes to 40 minutes in some embodiments. By performing the heating and the reducing at the heating temperature for the heating time in the exemplified ranges, the metal nanoparticles can be formed.

[3-2: Additive Solvent Selection Step]

The producing method of the aspect includes an additive solvent selection step of selecting an additive solvent having a distance Ra between a Hansen solubility parameter of the metal nanoparticles and a Hansen solubility parameter of the additive solvent in a range of from 2.5 to 13 and a distance Rb between a Hansen solubility parameter of the water or the hydrophilic solvent and the Hansen solubility parameter of the additive solvent of 35 or less.

The additive solvent selected in this step has the above-described features.

In this step, the HSP value of the metal nanoparticles can be determined by, for example, the following procedure. A dispersion liquid containing metal nanoparticles, for example, the conductive ink or the conductive paste of the one aspect of the present disclosure is centrifuged, thereby obtaining a precipitate of the metal nanoparticles. The obtained precipitate of the metal nanoparticles is added to each of a plurality of publicly known solvents having the known HSP values so as to provide predetermined concentrations. After stirring the obtained dispersion liquids of the respective publicly known solvents, the dispersion liquids are allowed to stand. After standing still, when the metal nanoparticles in the dispersion liquid are dispersed, the determination of "1" is given, and when the metal nanoparticles in the dispersion liquid are precipitated, the determination of "0" is given. The HSP values ($\delta D$, $\delta P$, and $\delta H$) of the respective publicly known solvents contained in the dispersion liquids determined as "1" are plotted in an HSP space, thus producing a Hansen solubility sphere. The Hansen solubility sphere can be created using the computer software, such as HSPiP. Based on the central coordinate of the solubility sphere, the HSP value of silver nanoparticles is determined.

In this step, the HSP value of the water or the hydrophilic solvent and the HSP value of the additive solvent can be obtained by referring to the database that records the HSP values of publicly-known substances. When the HSP values of the hydrophilic solvent and/or the additive solvent are not known, the HSP value can be calculated from the chemical structure by using the computer software, such as HSPiP. Alternatively, the HSP values of the hydrophilic solvent and/or the additive solvent can be determined by a method similar to the above-described method for determining the HSP value of the metal nanoparticles.

In this step, the distance Ra can be calculated as a distance between the HSP of the metal nanoparticles and the HSP of the additive solvent present in the HSP space. Similarly, the distance Rb can be calculated as a distance between the HSP of the water or the hydrophilic solvent and the HSP of the additive solvent present in the HSP space. The distances Ra and Rb can be calculated using the computer software, such as HSPiP.

In this step, by calculating the distances Ra and Rb by the above-described procedure, the additive solvent that satisfies the predetermined condition can be selected.

[3-3: Dispersion Step]

The producing method of the aspect may include a dispersion step of dispersing the metal nanoparticles in the water or the hydrophilic solvent and the additive solvent as necessary.

In this step, the metal nanoparticles can be dispersed by ordinary means, such as an ultrasonic treatment.

By performing the producing method of the aspect including the above-described steps, the conductive ink or the conductive paste of the one aspect of the present disclosure can be produced.

4: Method for Selecting Additive Solvent

Another aspect of the present disclosure relates to a method for selecting the additive solvent contained in the conductive ink or the conductive paste of the one aspect of the present disclosure. The method of the aspect includes an additive solvent selection step.

In the additive solvent selection step, an additive solvent having the Hansen solubility parameter with the distance Ra from the Hansen solubility parameter of the metal nanoparticles in a range of from 2.5 to 13 and the distance Rb from the Hansen solubility parameter of the water or the hydrophilic solvent of 35 or less is selected.

This step can be performed similarly to the above-described additive solvent selection step in the producing method of the one aspect of the present disclosure.

EXAMPLES

The following further specifically describes the present disclosure using examples. However, the technical scope of the present disclosure are not limited to these examples.

I: Production of Conductive Ink

[I-1: Metal Nanoparticle Preparation]

A silver nitrate aqueous solution (concentration: 400 mM) as a metal ion was added to a PVP aqueous solution (weight average molecular weight: 40,000 g/mol, concentration: 150 mM), subsequently, N,N-dimethylformamide (DMF) (concentration: 4,000 mM) was added, and further, a purified water was added by a predetermined amount so as to obtain the above-described concentrations of the respective components, thus preparing a reaction solution. The obtained reaction solution was poured into a separable flask of 500 mL, and reacted at 90° C. (reaction temperature) for 40 minutes (reaction time) while being stirred with a magnetic stirrer, thus preparing a dispersion liquid of silver nanoparticles containing PVP as a protective agent and having an average particle diameter of 25 nm. A dispersion liquid of silver nanoparticles without a protective agent was prepared by the procedure similar to the above excluding that the PVP aqueous solution was not added. A dispersion liquid of silver nanoparticles containing tannic acid as a protective agent was prepared by the procedure similar to the above excluding that a tannic acid aqueous solution (concentration: 150 mM) was used instead of the PVP aqueous solution.

[I-2: Additive Solvent Selection]

The additive solvent was selected using HSPiP (Hansen Solubility Parameters in Practice) that is commercially available computer software. From the database recording over 1,200 solvents included in HSPiP, only the solvents having the boiling point of 250° C. or less were extracted. A solvent specified as a poisonous substance or a solvent containing a halogen element were removed from the extracted solvents, thus producing a primary group of the solvent.

The HSP value of silver nanoparticles prepared in I-1 was measured by the following procedure. The dispersion liquid of silver nanoparticles was centrifuged, thereby obtaining a precipitate of the silver nanoparticles. The obtained precipitate of the silver nanoparticles was added to solvents indicated in Table 1 so as to obtain the concentration of 0.1 mass %. The obtained dispersion liquids of the respective solvents were stirred at room temperature (25° C.) for 10 minutes. After the stirring, the dispersion liquids were allowed to stand at room temperature (25° C.) for one hour. After standing still, when the silver nanoparticles in the dispersion liquid were dispersed, the determination of "1" was given, and when the silver nanoparticles in the dispersion liquid were precipitated, the determination of "0" was given. The HSP values ($\delta D$, $\delta P$, and $\delta H$) of the respective solvents contained in the dispersion liquids determined as "1" were plotted in an HSP space using HSPiP, thus creating a Hansen solubility sphere. Based on the central coordinate of the solubility sphere, the HSP value of silver nanoparticles was determined.

TABLE 1

| No. | Solvent |
| --- | --- |
| 1 | Acetone |
| 2 | Benzyl Alcohol |
| 3 | 1-Butanol |
| 4 | Butyl Acetate |
| 5 | Butyl Butyrate |
| 6 | Dimethylacetamide |
| 7 | Dimethylsulfoxide |
| 8 | Ethanol |
| 9 | γ-Butyrolactone |
| 10 | Hexane |
| 11 | Methyl Benzoate |
| 12 | Methyl Isobutyl Ketone (MIBK) |
| 13 | N-Methyl Pyrrolidone (NMP) |

TABLE 1-continued

| No. | Solvent |
|-----|---------|
| 14  | Tetrahydrofuran (THF) |
| 15  | N-Methylformamide |

From the measured HSP value of silver nanoparticles and the HSP values of the solvents included in the primary group, the solvents were arranged in ascending order of the distance Ra between both HSPs. The upper 85 solvents were extracted from the arranged solvents, thus producing a secondary group of the solvent. The solvents included in the secondary group were ranked by points from 1 to 85 according to the arrangement order.

From the HSP values of the 85 solvents ranked based on the distance Ra and the HSP value of the water or the hydrophilic solvent (ethanol, hexanediol, or the like), the solvents were arranged in ascending order of the distance Rb between both HSPs. The arranged solvents were ranked by points from 1 to 85 according to the arrangement order.

The 85 solvents ranked based on the distances Ra and Rb were arranged in ascending order of boiling point. The arranged solvents were ranked by points from 1 to 85 according to the arrangement order.

For each of the 85 solvents included in the secondary group, an average value of the ranks of the distances Ra, Rb and the boiling point was calculated. The solvents were arranged in ascending order of the calculated average value of the ranks, thus producing a candidate group of the additive solvent.

[I-3: Preparation of Dispersion Liquid of Metal Nanoparticles]

The dispersion liquid of metal nanoparticles was ultrafiltrated at room temperature for three hours. Pure water was used for a cleaning fluid in the ultrafiltration. The electric conductivity of a filtration residue of metal nanoparticles was 20 μS/cm or less. With an evaporator (manufactured by BUCHI, rotatory evaporator B-490), the solvent (water) of the filtration residue of metal nanoparticles was vaporized, thus obtaining a dispersion liquid of metal nanoparticles containing a solid content of 20 mass %.

An ultrasonic treatment (time: 10 minutes, output: 200 W) was performed on the dispersion liquid of metal nanoparticles obtained by the above-described procedure using an ultrasonic homogenizer (manufactured by Hielscher Ultrasonics GmbH, UP400St). An additive solvent was added to the dispersion liquid that had undergone the ultrasonic treatment by an amount calculated to obtain a predetermined final concentration. For example, when the predetermined final concentration was 5 mass %, the additive solvent having the mass of one fourth of the metal nanoparticles was weighed and add to the dispersion liquid of metal nanoparticles containing the solid content of 20 mass %. With an evaporator (manufactured by BUCHI, rotatory evaporator B-490), the solvent of the dispersion liquid of metal nanoparticles to which the additive solvent was added was vaporized in a hot-water bath at 40° C., thus obtaining a dispersion liquid of metal nanoparticles containing a solid content of 15 mass %. It was confirmed in advance that the additive solvent was not vaporized in the above-described procedure. An ultrasonic treatment (time: 15 minutes, output: 200 W) was performed on the obtained dispersion liquid of metal nanoparticles using an ultrasonic homogenizer (manufactured by Hielscher Ultrasonics GmbH, UP400St), thus obtaining a conductive ink as a dispersion liquid of metal nanoparticles.

The HSP values of the respective components contained in the conductive inks of Examples and Comparative Examples are illustrated in Table 2. In the table, in the row of Metal Nanoparticles, "A" means silver nanoparticles having PVP as a protective agent, "B" means silver nanoparticles having tannic acid as a protective agent, and "C" means silver nanoparticles without a protective agent.

TABLE 2

| | Additive Solvent | HSP Value of Additive Solvent | | |
|---|---|---|---|---|
| | | $\delta D$ | $\delta P$ | $\delta H$ |
| Example 1 | 3-Methoxy-3-Methyl Butanol | 16 | 6.3 | 12.9 |
| Example 2 | Diacetone Alcohol | 15.8 | 8.2 | 10.8 |
| Example 3 | Ethyl Lactate | 16 | 7.6 | 12.5 |
| Example 4 | Ethyl Lactate | 16 | 7.6 | 12.5 |
| Example 5 | Ethyl Lactate | 16 | 7.6 | 12.5 |
| Example 5-2 | Ethyl Lactate | 16 | 7.6 | 12.5 |
| Example 6 | Propylene Glycol | 16.8 | 10.4 | 21.3 |
| Example 7 | Propylene Glycol | 16.8 | 10.4 | 21.3 |
| Example 8 | N,N-Dimethylacetamide | 16.8 | 11.5 | 9.4 |
| Comparative Example 1 | — | — | — | — |
| Comparative Example 2 | Propylene Glycol | 16.8 | 10.4 | 21.3 |
| Comparative Example 3 | N,N-Dimethylformamide | 17.4 | 13.7 | 11.3 |
| Comparative Example 4 | Furfural | 18.6 | 14.9 | 5.1 |
| Comparative Example 5 | Ethyl Lactate | 16 | 7.6 | 12.5 |

| | Water or Hydrophilic Solvent | HSP Value of Water or Hydrophilic Solvent | | |
|---|---|---|---|---|
| | | $\delta D$ | $\delta P$ | $\delta H$ |
| Example 1 | Water | 15.5 | 16.0 | 42.3 |
| Example 2 | | 15.5 | 16.0 | 42.3 |
| Example 3 | | 15.5 | 16.0 | 42.3 |
| Example 4 | | 15.5 | 16.0 | 42.3 |
| Example 5 | | 15.5 | 16.0 | 42.3 |
| Example 5-2 | | 15.5 | 16.0 | 42.3 |
| Example 6 | | 15.5 | 16.0 | 42.3 |
| Example 7 | Ethanol | 15.8 | 8.8 | 19.4 |
| Example 8 | Water | 15.5 | 16.0 | 42.3 |
| Comparative Example 1 | | 15.5 | 16.0 | 42.3 |
| Comparative Example 2 | | 15.5 | 16.0 | 42.3 |
| Comparative Example 3 | | 15.5 | 16.0 | 42.3 |
| Comparative Example 4 | | 15.5 | 16.0 | 42.3 |
| Comparative Example 5 | Hexanediol | 17.4 | 9.8 | 18.3 |

| | Metal Nanoparticles | HSP Value of Metal Nanoparticles | | |
|---|---|---|---|---|
| | | $\delta D$ | $\delta P$ | $\delta H$ |
| Example 1 | A | 16.9 | 14.4 | 9.4 |
| Example 2 | A | 16.9 | 14.4 | 9.4 |
| Example 3 | A | 16.9 | 14.4 | 9.4 |
| Example 4 | A | 16.9 | 14.4 | 9.4 |
| Example 5 | A | 16.9 | 14.4 | 9.4 |
| Example 5-2 | C | 16.8 | 14.6 | 9.2 |
| Example 6 | A | 16.9 | 14.4 | 9.4 |
| Example 7 | A | 16.9 | 14.4 | 9.4 |
| Example 8 | A | 16.9 | 14.4 | 9.4 |
| Comparative Example 1 | A | 16.9 | 14.4 | 9.4 |
| Comparative Example 2 | B | 17.2 | 11.8 | 7.4 |
| Comparative Example 3 | A | 16.9 | 14.4 | 9.4 |
| Comparative Example 4 | A | 16.9 | 14.4 | 9.4 |
| Comparative Example 5 | A | 17.4 | 9.8 | 18.3 |

II: Evaluation of Conductive Ink

[II-1: Viscosity Measurement of Conductive Ink]

The viscosity of the conductive ink was measured under the condition of 23° C., 10 $s^{-1}$ using a viscosimeter (manufactured by TA Instruments, DHR-2).

[II-2: Preparation of Conductive Ink Sintered Film]

The obtained conductive ink was dropped on a slide chamber. The slide chamber was allowed to stand in a constant temperature bath at 80° C. for 60 minutes. Thus, the conductive ink of metal nanoparticles was sintered, and the film was formed.

[II-3: Crack Observation of Conductive Ink Sintered Film]

A cross-sectional surface of the sintered film of the conductive ink was observed using a scanning electron microscope, and the presence/absence of the crack was confirmed.

[II-4: Resistivity Measurement of Conductive Ink Sintered Film]

The volume resistivity of the sintered film of the conductive ink was measured using a resistivity meter (manufactured by Nittoseiko Analytech Co., Ltd., Loresta-GX MCP-T700).

Table 3 illustrates compositions and physical properties of the conductive inks of Examples and Comparative Examples, and evaluation results thereof. In the table, in the row of Metal Nanoparticles, "A" means silver nanoparticles having PVP as a protective agent, "B" means silver nanoparticles having tannic acid as a protective agent, and "C" means silver nanoparticles without a protective agent. In the row of Crack, "Good" means that the crack was not observed, and "Poor" means that the crack was observed.

As illustrated in Table 3, any of the conductive inks of Examples had the viscosity in the range of from 1 mPa·s to 4 mPa·s. In contrast, any of the conductive inks of Comparative Examples 1, 3, and 4 had the viscosity in the range of 1 mPa·s or less. The conductive ink of Comparative Example 5 had the viscosity of 270 mPa·s. Since the viscosity of the conductive ink appropriate for printing methods is in the range of from 1 mPa·s to 20 mPa·s, it became obvious that the conductive inks of Examples were appropriate for printing methods.

In any of the sintered films of the conductive inks of Examples, the crack was not confirmed. In contrast, in the sintered films of the conductive inks of Comparative Examples 1 and 2, the crack was confirmed. From this result, it became obvious that the conductive inks of Examples had excellent low-temperature sinterability. Additionally, any of the sintered films of the conductive inks of Examples had the low volume resistivity of less than 20 μΩ·cm. In contrast, any of the sintered films of the conductive inks of Comparative Examples had the high volume resistivity.

The present disclosure is not limited to the examples described above and includes various modifications. The examples described above have been described in detail to facilitate understanding of the present disclosure and are not necessarily limited to those having all the described configuration. It is also possible to add, delete, and/or replace part of the configuration of each example with another configuration.

What is claimed is:

1. A conductive ink or a conductive paste comprising:
   metal nanoparticles;
   water or a hydrophilic solvent having a vapor pressure of 10 hPa or more; and
   an additive solvent,
   wherein:
   a distance Ra between a Hansen solubility parameter of the metal nanoparticles and a Hansen solubility parameter of the additive solvent is in a range of from 2.5 to 13,
   a distance Rb between a Hansen solubility parameter of the water or the hydrophilic solvent and the Hansen solubility parameter of the additive solvent is 35 or less, and
   the conductive ink has a viscosity in a range of from 1 mPa·s to 4 mPa·s, as measured at 23° C. and a shear rate of 10 s$^{-1}$.

2. The conductive ink or the conductive paste according to claim 1,
   wherein a content of the additive solvent is in a range of from 0.5 mass % to 15 mass % relative to a total mass of the conductive ink or the conductive paste.

3. The conductive ink or the conductive paste according to claim 1,
   wherein the metal nanoparticles have a protective agent, the protective agent is a compound containing nitrogen

TABLE 3

| | Additive Solvent | Water or Hydrophilic Solvent | Metal Nanoparticles | Addition Amount of Additive Solvent | Ra | Rb | Vapor Pressure of Water or Hydrophilic Solvent [hPa]@20° C. | Viscosity [mPa · s] | Crack | Resistance Value [μΩ · cm] |
|---|---|---|---|---|---|---|---|---|---|---|
| Example 1 | 3-Methoxy-3-Methyl Butanol | Water | A | 5 mass % | 9.0 | 31.0 | 17 | 1.32 | Good | 10.1 |
| Example 2 | Diacetone Alcohol | | A | 5 mass % | 6.7 | 32.5 | | 1.28 | Good | 13 |
| Example 3 | Ethyl Lactate | | A | 0.5 mass % | 7.7 | 31.0 | | 2.08 | Good | 9.9 |
| Example 4 | Ethyl Lactate | | A | 5 mass % | | | | 2.18 | Good | 10.9 |
| Example 5-1 | Ethyl Lactate | | A | 15 mass % | | | | 3.24 | Good | 15.8 |
| Example 5-2 | Ethyl Lactate | | C | 5 mass % | 7.8 | | | 2.02 | Good | 16.5 |
| Example 6 | Propylene Glycol | | A | 5 mass % | 12.6 | 21.8 | | 2.68 | Good | 18.4 |
| Example 7 | Propylene Glycol | Ethanol | A | 5 mass % | 12.6 | 2.6 | 59 | 2.55 | Good | 18.2 |
| Example 8 | N,N-Dimethylacetamide | Water | A | 5 mass % | 2.9 | 33.2 | 17 | 1.22 | Good | 14 |
| Comparative Example 1 | — | | A | — | — | — | | 0.81 | Poor | 47 |
| Comparative Example 2 | Propylene Glycol | | B | 5 mass % | 14.0 | 21.8 | | 2.7 | Poor | 100 |
| Comparative Example 3 | N,N-Dimethylformamide | | A | 5 mass % | 2.3 | 31.3 | | 0.9 | Good | 126 |
| Comparative Example 4 | Furfural | | A | 5 mass % | 5.6 | 37.7 | | 0.8 | Good | 1260 |
| Comparative Example 5 | Ethyl Lactate | Hexanediol | A | 5 mass % | 7.7 | 6.4 | 0.7 | 270 | Good | 3000 | atoms or sulfur atoms, and the compound has high adsorptivity to a metal and hydrophilicity.

4. The conductive ink or the conductive paste according to claim 3,
wherein the protective agent is polyvinylpyrrolidone.

5. The conductive ink or the conductive paste according to claim 1,
wherein the water or the hydrophilic solvent is water, methanol, ethanol, propanol, tert-butyl alcohol, or glycidol.

6. The conductive ink or the conductive paste according to claim 5,
wherein the water or the hydrophilic solvent is water or ethanol.

7. The conductive ink or the conductive paste according to claim 1,
wherein the additive solvent is 3-methoxy-3-methyl butanol, diacetone alcohol, ethyl lactate, propylene glycol, N,N-dimethylacetamide, tetrahydrofurfuryl alcohol, tetramethylurea, N,N-dimethylformamide, methylcyclohexanol, heptanol, hexanol, or ethylene glycol, or a mixture thereof.

8. The conductive ink or the conductive paste according to claim 7,
wherein the additive solvent is 3-methoxy-3-methyl butanol, diacetone alcohol, ethyl lactate, propylene glycol, or N,N-dimethylacetamide.

9. A method for producing the conductive ink or the conductive paste according to claim 1, the method comprising:
preparing metal nanoparticles and a water or a hydrophilic solvent having a vapor pressure of 10 hPa or more; and
selecting an additive solvent having a Hansen solubility parameter with a distance Ra from a Hansen solubility parameter of the metal nanoparticles in a range of from 2.5 to 13 and a distance Rb from a Hansen solubility parameter of the water or the hydrophilic solvent of 35 or less.

10. The conductive ink or the conductive paste according to claim 1, wherein the viscosity of the conductive ink is in a range of from 1.22 mPa·s to 3.24 mPa·s.

11. The conductive ink according to claim 1.

12. The conductive paste according to claim 1.

13. A method for selecting an additive solvent contained in a conductive ink or a conductive paste, the conductive ink or the conductive paste containing metal nanoparticles, water or a hydrophilic solvent having a vapor pressure of 10 hPa or more, and the additive solvent, the method comprising:
selecting an additive solvent having a Hansen solubility parameter with:
a distance Ra from a Hansen solubility parameter of the metal nanoparticles in a range of from 2.5 to 13, and
a distance Rb from a Hansen solubility parameter of the water or the hydrophilic solvent of 35 or less,
wherein the conductive ink has a viscosity in a range of from 1 mPa·s to 4 mPa·s, as measured at 23° C. and a shear rate of 10 s$^{-1}$.

14. The method according to claim 13, wherein the viscosity of the conductive ink is in a range of from 1.22 mPa·s to 3.24 mPa·s.

15. The method according to claim 13, for selecting an additive solvent contained in a conductive ink.

16. The method according to claim 13, for selecting an additive solvent contained in a conductive paste.

* * * * *